(12) United States Patent
Yadav et al.

(10) Patent No.: US 10,298,465 B2
(45) Date of Patent: May 21, 2019

(54) USING MACHINE LEARNING TO MONITOR LINK QUALITY AND PREDICT LINK FAULTS

(71) Applicant: Juniper Networks, Inc., Sunnyvale, CA (US)

(72) Inventors: Alam Yadav, Bangalore (IN); Madhava N, Bangalore (IN); Saikat Sanyal, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 3 days.

(21) Appl. No.: 15/666,015

(22) Filed: Aug. 1, 2017

(65) Prior Publication Data

US 2019/0044824 A1    Feb. 7, 2019

(51) Int. Cl.
*H04L 12/24*      (2006.01)
*H04L 12/26*      (2006.01)
(Continued)

(52) U.S. Cl.
CPC .......... H04L 41/147 (2013.01); H04L 41/16 (2013.01); H04L 43/04 (2013.01);
(Continued)

(58) Field of Classification Search
CPC ............ H04L 41/0823; H04L 41/0803; H04L 41/147; H04L 47/805; H04W 24/08
See application file for complete search history.

(56) References Cited

U.S. PATENT DOCUMENTS

2003/0091017 A1* 5/2003 Davenport ........... H04B 17/318
370/338

2006/0020509 A1* 1/2006 Strain .................. G06Q 10/109
705/14.25

(Continued)

FOREIGN PATENT DOCUMENTS

| EP | 2 469 757 A1 | 6/2012 |
| EP | 3 133 492 A1 | 2/2017 |
| WO | WO 2015/175260 A1 | 11/2015 |

OTHER PUBLICATIONS

Juniper Networks, "Understand MX Fabric", https://kb.juniper.net/InfoCenter/index?page=content&id=KB23065&actp=METADATA, 2017, 3 pages.

Awuah, "Juniper Networks Router Architecture", https://www.slideshare.net/lawuah/juniper-networks-router-architecture, Feb. 20, 2011, 19 pages.

(Continued)

*Primary Examiner* — Chi Ho A Lee
(74) *Attorney, Agent, or Firm* — Harrity & Harrity, LLP

(57) ABSTRACT

A device may receive a trained data model that has been trained using historical link quality information associated with a set of links. The device may determine, after receiving the trained data model, link quality information associated with a link that is actively supporting traffic. The device may classify the link by using the link quality information as input for the data model. The data model may classify the link into a class of a set of classes associated with measuring link quality. The device may determine an actual quality level of the link. The device may selectively update the class of the link after determining the actual link quality of the link. The device may perform one or more actions associated with improving link quality based on classifying the link and/or selectively updating the class of the link.

20 Claims, 10 Drawing Sheets

(51) Int. Cl.
*H04W 24/04* (2009.01)
*H04W 24/08* (2009.01)

(52) U.S. Cl.
CPC .......... *H04L 43/0847* (2013.01); *H04L 43/12* (2013.01); *H04W 24/04* (2013.01); *H04W 24/08* (2013.01); *H04L 43/50* (2013.01)

(56) References Cited

U.S. PATENT DOCUMENTS

| | | | | |
|---|---|---|---|---|
| 2009/0059793 | A1* | 3/2009 | Greenberg | H04L 41/0803 370/235 |
| 2010/0027418 | A1* | 2/2010 | Rodrig | H04L 41/147 370/235 |
| 2010/0118761 | A1* | 5/2010 | Wu | H04L 5/003 370/315 |
| 2012/0120843 | A1* | 5/2012 | Anderson | H04W 52/0232 370/253 |
| 2013/0176871 | A1* | 7/2013 | Bertze | H04W 24/08 370/252 |
| 2016/0057041 | A1 | 2/2016 | Gupta et al. | |
| 2016/0241435 | A1* | 8/2016 | Iordache | H04L 41/0823 |
| 2016/0262166 | A1* | 9/2016 | Wong | H04L 1/0026 |
| 2016/0266954 | A1 | 9/2016 | Paulraj et al. | |
| 2016/0364434 | A1* | 12/2016 | Spitz | G06F 17/30371 |
| 2017/0093750 | A1* | 3/2017 | McBride | H04L 47/805 |
| 2017/0264330 | A1* | 9/2017 | Huang | H04B 17/309 |

OTHER PUBLICATIONS

O'Reilly Safari, "Chapter 1. Juniper QFX10000 Hardware Architecture", https://www.safaribooksonline.com/library/view/juniper-qfx10000-series/9781491922248/ch01.html, 2017, 62 pages.

Juniper Networks TechLibrary, "Supported TX Matrix Plus Routing Matrix Configurations", http://www.juniper.net/documentation/en_US/release-independent/junos/topics/concept/tx-matrix-plus-supported-configurations.html, Dec. 19, 2014, 8 pages.

Juniper Networks TechLibrary, "Switching Plane Connections Between TXP-F13 SIBs and TXP-T1600 SIBS" http://www.juniper.net.documentation/en_US/release-independent/junos/topics/concept/switching-plane-tx-matrix-plus-connections.html, Dec. 19, 2017, 9 pages.

Co-pending U.S. Appl. No. 15/616,467, entitled "Avoiding False Duplicate Network Address Detection in Virtual Router Redundacy Protocol (VRRP) Scenarios," filed Jun. 7, 2017, by Johnson et al., 40 pages.

Extended European Search Report corresponding to EP 18 17 5135, dated Oct. 12, 2018, 7 pages.

Di Caro Gianni A et al: "Online supervised incremental learning of link quality estimates in wireless networks", 2013 12$^{th}$ annual Mediterranean AD HOC networking workshop (MED-HOC-NET), IEEE Jun. 24, 2013, p. 133-140.

Yong Wang et al: "Predicting link quality 1-15 using supervised learning in wireless sensor networks", vol. 11, No. 3, Jul. 1, 2007, p. 71-83.

Extended European Search Report corresponding to EP 18 17 5135, dated Oct. 30, 2018, 10 pages.

* cited by examiner

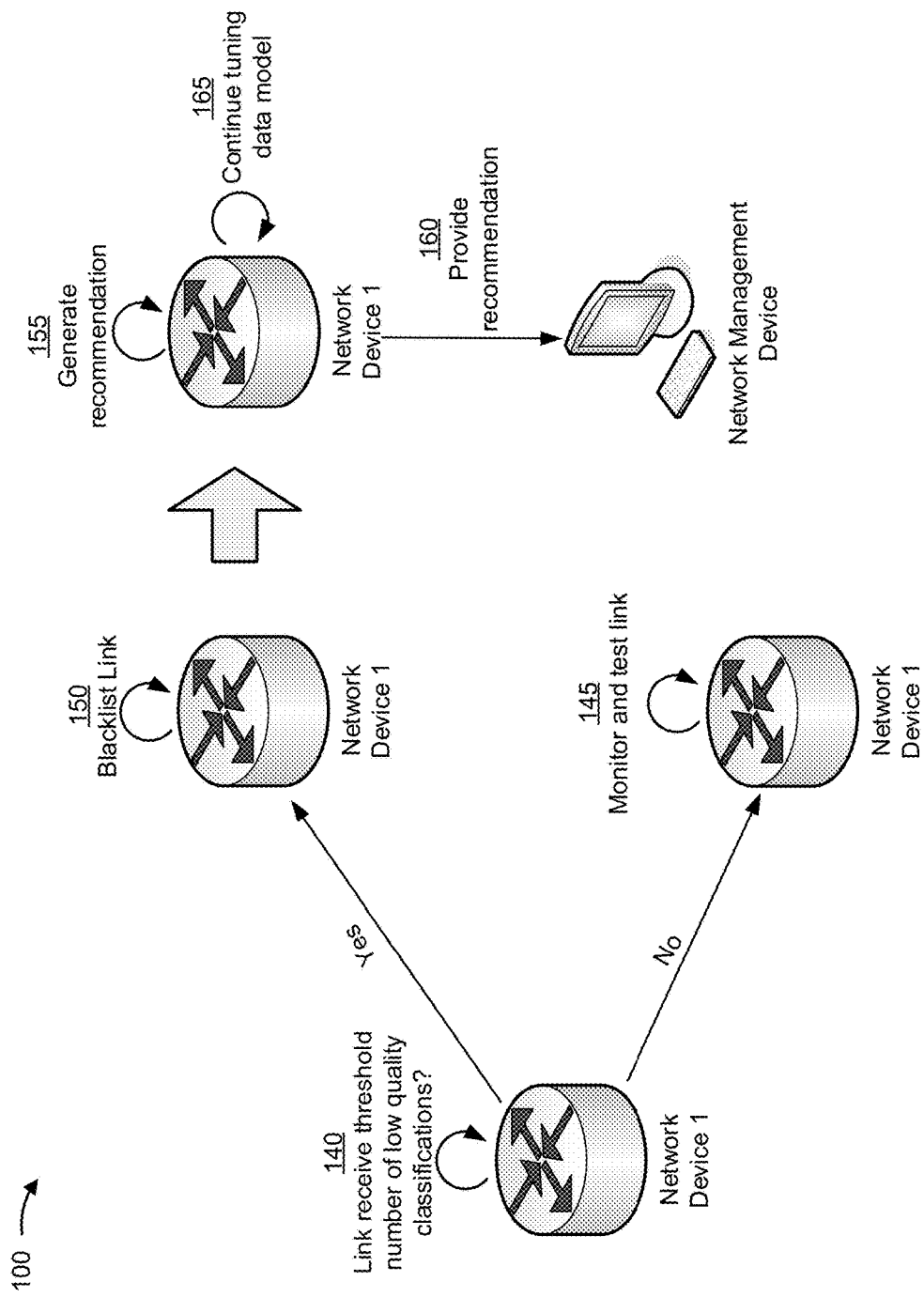

USING MACHINE LEARNING TO MONITOR LINK QUALITY AND PREDICT LINK FAULTS

BACKGROUND

A network device may include internal links and external links. For example, a network device may include internal links that allow traffic flow (e.g., packets) between components of the network device and/or external links that allow traffic flow between network devices.

SUMMARY

According to some possible implementations, a device may include one or more processors to receive a trained data model. The data model may be trained with historical link quality information associated with a set of links. The data model may include one or more values associated with measuring link quality. The one or more processors may determine, after receiving the trained data model, link quality information associated with a link that is actively supporting traffic flow. The one or more processors may classify the link by using the link quality information as input for the data model. The data model may classify the link into a first class associated with a first measure of link quality, a second class associated with a second measure of link quality, or a third class associated with a third measure of link quality. The one or more processors may determine whether the link is correctly classified by updating the data model with information associated with improving accuracy of classifying the link. The one or more processors may update a class of the link to the first class, the second class, or the third class after determining whether the link is correctly classified. The one or more processors may perform one or more actions associated with improving link quality based on classifying the link and/or updating a class of the link.

According to some possible implementations, a non-transitory computer-readable medium may store one or more instructions that, when executed by one or more processors, cause the one or more processors to obtain a data model that is trained using historical link quality information associated with a set of links. The historical link quality information may include one or more values associated with measuring link quality. The one or more instructions may cause the one or more processors to determine, after obtaining the data model, link quality information associated with a link that is actively supporting traffic flow. The one or more instructions may cause the one or more processors to classify the link by using the link quality information as input for the data model. The data model may classify the link into a class of a set of classes associated with measuring link quality. The one or more instructions may cause the one or more processors to determine whether the link is correctly classified by performing one or more actions associated with improving accuracy of classifying the link. The one or more instructions may cause the one or more processors to selectively update the class of the link after determining whether the link is correctly classified. The one or more instructions may cause the one or more processors to perform one or more actions associated with improving link quality based on classifying the link and/or selectively updating the class of the link.

According to some possible implementations, a method may include receiving, by a device, a trained data model. The trained data model may be trained using historical link quality information associated with a set of links. The method may include determining, by the device and after receiving the trained data model, link quality information associated with a link that is actively supporting traffic. The method may include classifying the link, by the device, by using the link quality information as input for the data model. The data model may classify the link into a class of a set of classes associated with measuring link quality. The method may include determining, by the device, an actual quality level of the link. The method may include selectively updating the class of the link, by the device, after determining the actual link quality of the link. The method may include performing, by the device, one or more actions associated with improving link quality based on classifying the link and/or selectively updating the class of the link.

BRIEF DESCRIPTION OF THE DRAWINGS

FIGS. 1A-1D are diagrams of an overview of an example implementation described herein;

DETAILED DESCRIPTION

The following detailed description of example implementations refers to the accompanying drawings. The same reference numbers in different drawings may identify the same or similar elements.

As demand for data services increases, the amount of traffic that a network device handles may increase. This may lead to higher bandwidth interconnects within a board (e.g., a printed circuit board (PCB)) located within the network device, and may further cause links (e.g., Serializer-Deserializer (SerDes) links) to be run at higher speeds. Furthermore, the board may be densely packed with internal links, causing interference and leading to link degradation over the life of the board. However, many network devices are only able to detect link faults (e.g., link degradation) after the faults occur.

Some implementations described herein provide a network device to use one or more machine learning techniques to monitor link quality and to detect link faults prior to the link incurring the fault. For example, a model generation device may use historical link quality information associated with a set of links to train a data model (e.g., by creating a prediction function), and may provide the trained data model (e.g., the prediction function) to a set of network devices. In this case, the set of network devices may classify links that actively support traffic flow by using link quality information associated with the links as input for the data model. Furthermore, the network device may perform one or more actions associated with improving accuracy of link classification and/or one or more actions associated with improving link quality (e.g., request to repair a link and/or a board, request to replace a board, adapt to environmental conditions associated with a link, etc.).

In this way, the set of network devices predict link faults and, by taking one or more pre-emptive actions, eliminate traffic loss via links associated with the set of network devices. Furthermore, by performing one or more actions associated with improving link quality, the set of network devices improve efficiency and reliability of network communications.

FIGS. 1A-1D are diagrams of an overview of an example implementation 100 described herein. As shown in FIGS. 1A-1D, example implementation 100 may include a model generation device that uses one or more machine learning techniques to train a data model that may be used to monitor link quality and detect link faults. Additionally, as described in detail further herein, a set of network devices may use the trained data model to perform one or more actions associated with improving accuracy of link classification and/or one or more actions associated with improving link quality.

Figure 1A:
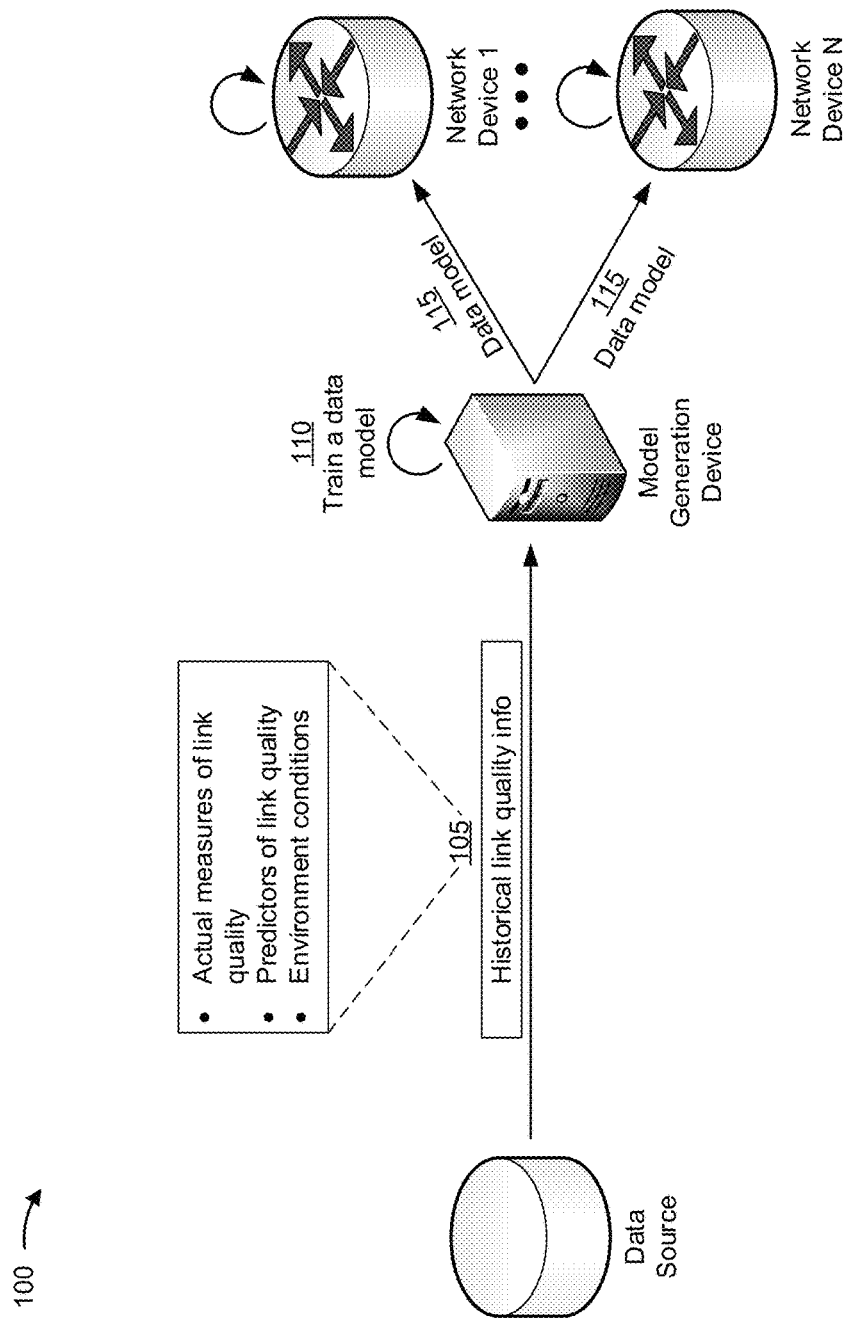

As shown in FIG. 1A, and by reference number 105, the model generation device may receive, from a data source, historical link quality information. The historical link quality information may include one or more values associated with measuring link quality. In this case, the historical performance information may include one or more actual measures of link quality, one or more predictors of link quality, and/or one or more environment conditions.

For example, the one or more actual measures of link quality may include one or more values associated with identifying errors in data transmission, such as a forward error correction (FEC) value, a cyclic redundancy check (CRC) value, one or more values measuring signal integrity, such as a signal-to-noise (SNR) ratio value, and/or the like. Additionally, the one or more predictors of link quality may include a bit error rate (BER) value, a link eye width value, a link eye height value, a link quality slope, and/or the like. Furthermore, the one or more environment conditions may include a temperature value (e.g., a temperature of the board, a temperature of the system, etc.), a link uptime value, and/or the like.

Furthermore, the historical link quality information may be associated with a set of network devices that operate under different environmental conditions, thereby allowing the model generation device to train a data model that accounts for a number of different environmental conditions.

As shown by reference number 110, the model generation device may train a data model. For example, the model generation device may train the data model by creating a prediction function that is able to classify links that are actively supporting traffic flow, as described further herein. In this case, the network device may create the prediction function by associating values included in the historical link quality information with quality coefficient values (e.g., values indicating a particular link quality measurement). Additionally, the network device may configure one or more weight values that may be used in determining an overall link quality score.

As an example, assume the historical link quality information includes five values (e.g., value A, value B, value C, value D, and value E). Further assume that value A has a positive influence on link quality (e.g., a high A value is a strong indicator of high link quality), that values B-D do not have a high influence on link quality, and that value E has a negative influence on link quality (e.g., a high E value is a strong indicator of low link quality). In this case, a prediction function may account for the varied degrees of influence by assigning values a polarity (e.g., positive, negative) and a weight (e.g., Link Quality=0.9A+0.1B+0.2C+0.05D−0.9E).

As shown by reference number 115, the model generation device may provide the data model to a set of network devices (shown as network device 1 through network device N). For example, the model generation device may provide the prediction function to the set of network devices to serve as an initial data model that each network device may implement when monitoring traffic flow.

In this way, the set of network devices may receive a trained data model that may be used to classify links that actively support traffic flow.

Figure 1B:
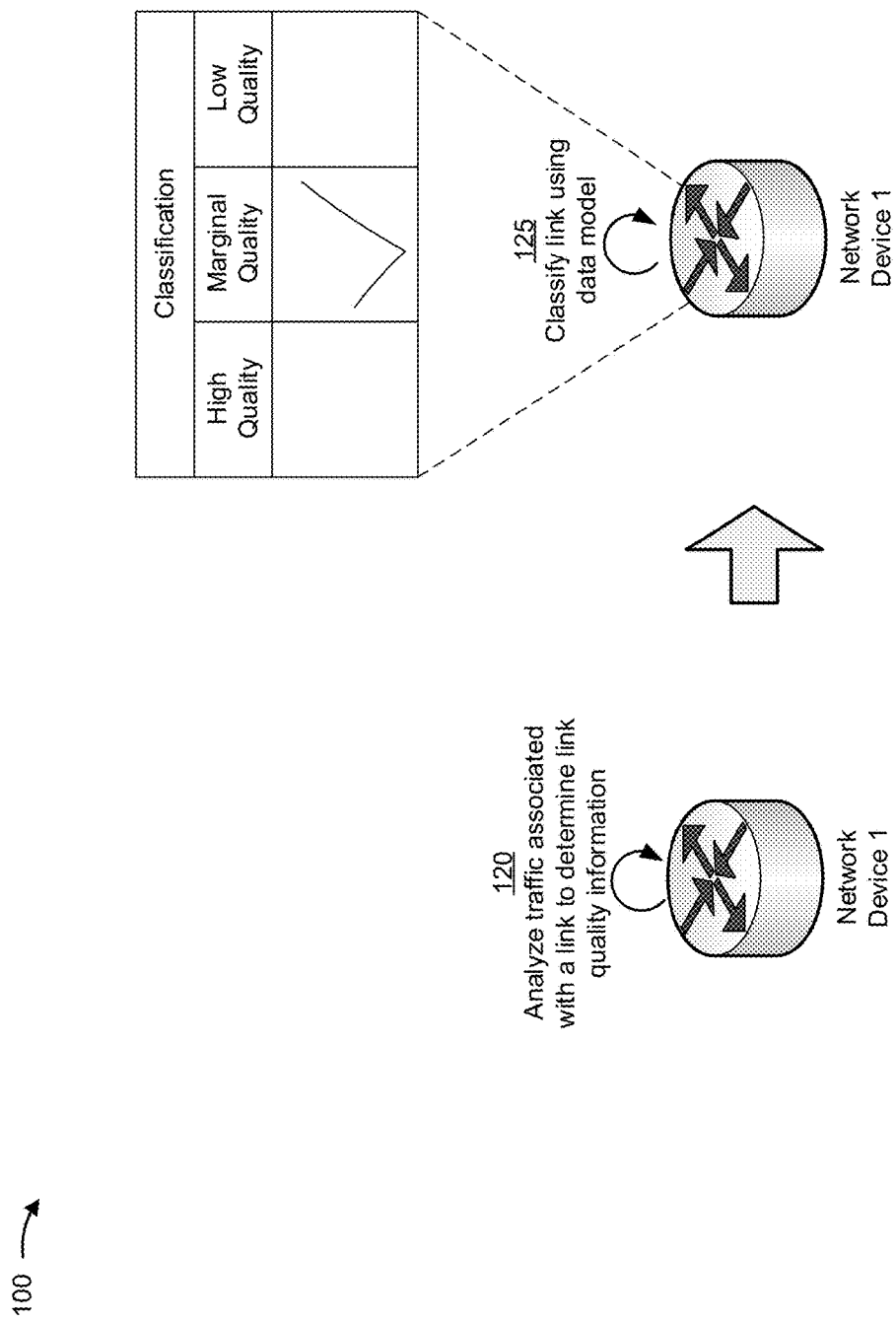
Figure 1C:
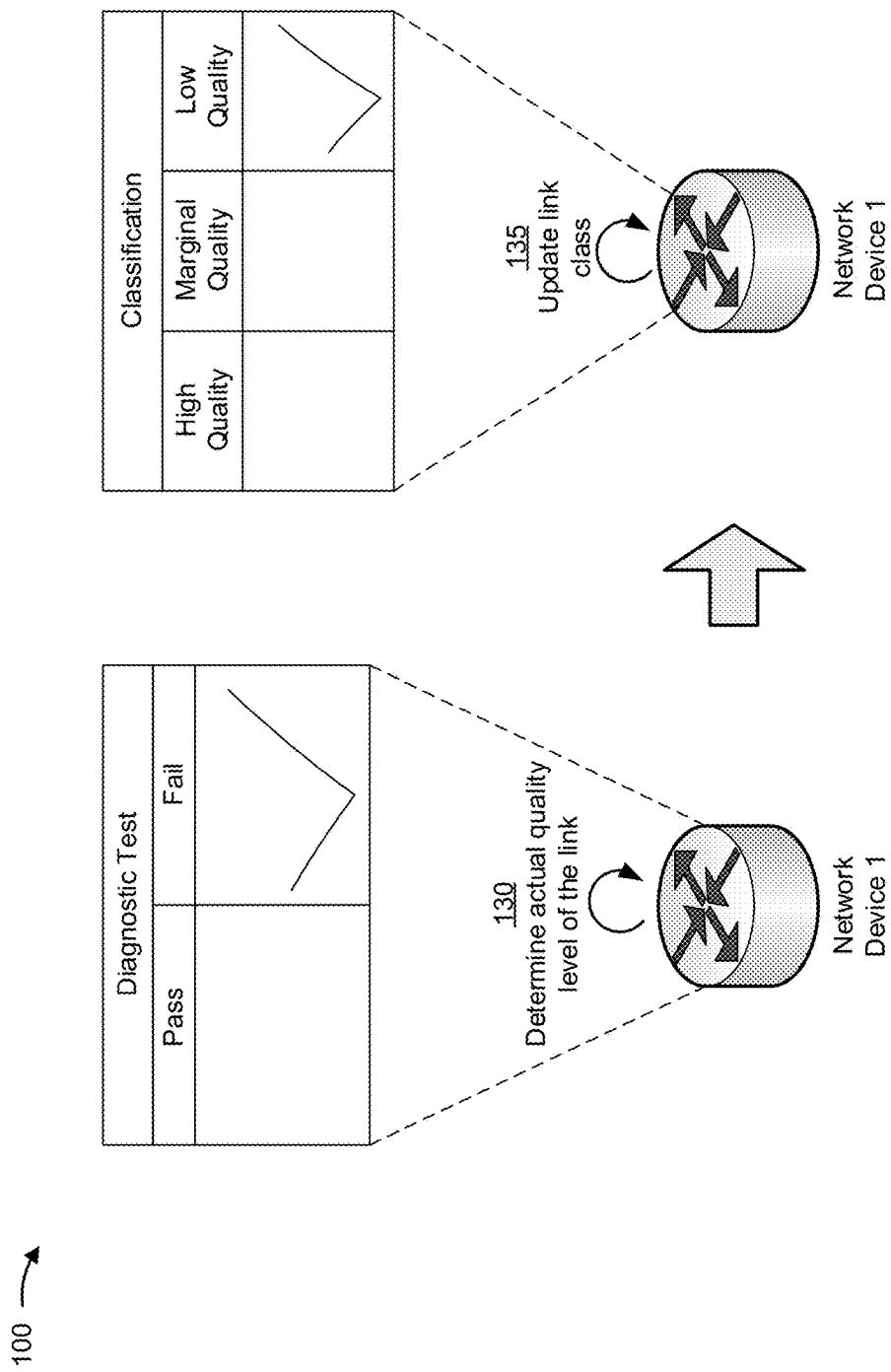

While FIGS. 1B-1D show a first network device (shown as network device 1) performing one or more actions associated with improving accuracy of link classification and/or one or more actions associated with improving link quality, in practice, the set of network devices (network device 1 through network device N) each perform one or more actions associated with improving accuracy of link classification and/or one or more actions associated with improving link quality.

As shown in FIG. 1B, and by reference number 120, the first network device may analyze traffic associated with a link to determine link quality information. For example, traffic may be passing through a link, and the first network device may use one or more performance monitoring techniques to determine link quality information for the link.

As an example, the first network device may determine a BER value by comparing bit string values before and after the bit string travels through the link. As another example, the first network device may use one or more sensors to measure temperature values associated with a board. As another example, the first network device may monitor traffic to determine a noise value and a signal value, and may process the values to determine an SNR value. In this way, the first network device may determine link quality information for a link that is actively supporting traffic flow.

As shown by reference number 125, the first network device may classify the link using the data model. For example, the first network device may classify the link by using the link quality information as input to the data model, which may cause the data model to output an overall link quality score. In some cases, the overall link quality score may be associated with one or more link quality classes, such as a class associated with high link quality, a class associated with marginal link quality, or a class associated with low link quality. In the example shown, the data model may classify the link into a class associated with marginal link quality.

By using the data model to classify the link, the first network device may perform one or more actions associated with improving accuracy of link classification and/or one or more actions associated with improving link quality, as described further herein.

As shown in FIG. 1C, and by reference number 130, the first network device may determine an actual quality level of the link. For example, the first network device may determine an actual quality level of the link while the link is active and/or may determine an actual quality level of the link after disabling the link. As an example, the first network device may determine an actual quality level of the link while the link is active by executing non-intrusive techniques such as an FEC technique, a CRC technique, or the like. As another example, the first network device may disable the link after traffic has been redirected to another link (so as to prevent traffic drop on the link), and may determine an actual quality level of the link by performing a diagnostic test on the link. In some cases, the first network device may use a pseudorandom binary sequence (PRBS) test to monitor bits that travel through the link. In this case, the link may pass or fail the PRBS test based on a number of bits that successfully travel through the link. As shown as an example, assume that a threshold amount of bits change value (e.g., from 0 to 1 or from 1 to 0) as the bits travel through the link. This may cause the link to fail the diagnostic test, indicating that the link is a low quality link.

Additionally, the first network device may determine whether the link is correctly classified. For example, the first network device may compare the classification of the link and the actual quality level of the link (e.g., as indicated by the diagnostic test). If the classification of the link and the actual quality level of the link does not match (i.e., the link is incorrectly classified), then the first network device may update the data model by modifying one or more quality coefficient values to improve subsequent classifications of the link. For example, the first network device may receive a classification as a marginal quality link (e.g., as a result of training data), but may have an actual link classification of low link quality due to environment conditions that are specific to the first network device. In this way, the first network device may update the data model to dynamically adapt to the environment conditions that are specific to the first network device.

As shown by reference number 135, the first network device may update the class of the link. For example, the first network device may update the class of the link based on a result of the diagnostic test. In this case, the first network device may update the class of the link to a different class than the previous classification. For example, the first network device may update the class of the link to a class associated with high link quality if the link passes the diagnostic test, and may update the class of the link to a class associated with low link quality if the link fails the diagnostic test. Alternatively, the first network device may update the class of the link by re-using the link quality information as input for the data model. In this case, the data model may output a more accurate link quality prediction as a result of modifying the one or more quality coefficient values associated with the data model. In the example shown, the first network device may update the class of the link to a class associated with low link quality.

By determining an actual quality level of the link and updating the class of the link, the first network device is able to improve accuracy of link classification. Furthermore, if the link is classified or reclassified as a low quality link, the first network device may disable the link to prevent subsequent traffic from suffering from packet loss.

As shown in FIG. 1D, and by reference number 140, the first network device may determine whether the link has received a threshold number of classifications associated with low link quality. For example, the first network device may monitor the link over an interval, and may periodically classify the link throughout the interval. In this case, if the first network device classifies the link as a low quality link, then the first network device may compare a current number of times the link is classified as a low quality link to a threshold number of classifications associated with low link quality. In this way, the first network device is able to identify whether to blacklist the link (i.e., prevent the link from being able to actively support traffic flow) or to monitor and test the link.

As shown by reference number 145, if the current number of times the link is classified as a low quality link does not satisfy the threshold number of classifications associated with low link quality, then the first network device may monitor and test the link. For example, the first network device may continue to monitor the link, perform an additional diagnostic test on the link, execute additional FED techniques and/or update the data model to improve accuracy of link classification, and/or the like. In this way, the first network device is able to verify whether the link is a low quality link before blacklisting the link and/or performing additional actions associated with improving link quality.

As shown by reference number 150, if the current number of times the link is classified as a low quality link satisfies the threshold number of classifications associated with low link quality, then the first network device may blacklist the link. In this case, the first network device may blacklist the link to prevent the link from being able to actively support traffic flow. By blacklisting the link, the first network device avoids traffic drops and link faults that may result if the low quality link continues supporting traffic flow, thereby improving quality of network communications.

As shown by reference number 155, the first network device may generate a recommendation. For example, the first network device may generate a recommendation to repair the link (e.g., an internal link, an external link) and/or the board, replace the link (e.g., an external link) and/or the board, or the like. In this case, the recommendation may include the link quality information associated with the link, results of the diagnostic test, and/or instructions indicating a particular action to be performed (e.g., repair the link, repair the board, replace the link, replace the board, etc.).

As shown by reference number 160, the first network device may provide the recommendation to a network management device associated with an interested party (e.g., a technician). In this way, the interested party may repair and/or replace the link and/or the board, thereby improving network communications relative to allowing a low quality link to continue to support traffic flow.

In some implementations, the first network device may generate and provide a recommendation for a link that is classified or reclassified into a class associated with marginal link quality. In this way, the interested party may repair and/or replace the link and/or the board prior to packet drop and/or signal loss.

As shown by reference number 165, the first network device may continue tuning the data model. For example, the first network device may continue to monitor traffic flow and modify the data model to improve accuracy of link classification, adapt to environmental conditions associated with the link, use a forecasting technique to identify a link fault prior to the fault occurring, and/or the like.

In this way, the first network device is able to manage link quality and predict link faults prior to the occurrence of the links faults.

As indicated above, FIGS. 1A-1D are provided merely as an example. Other examples are possible and may differ from what was described with regard to FIGS. 1A-1D.

Figure 2:
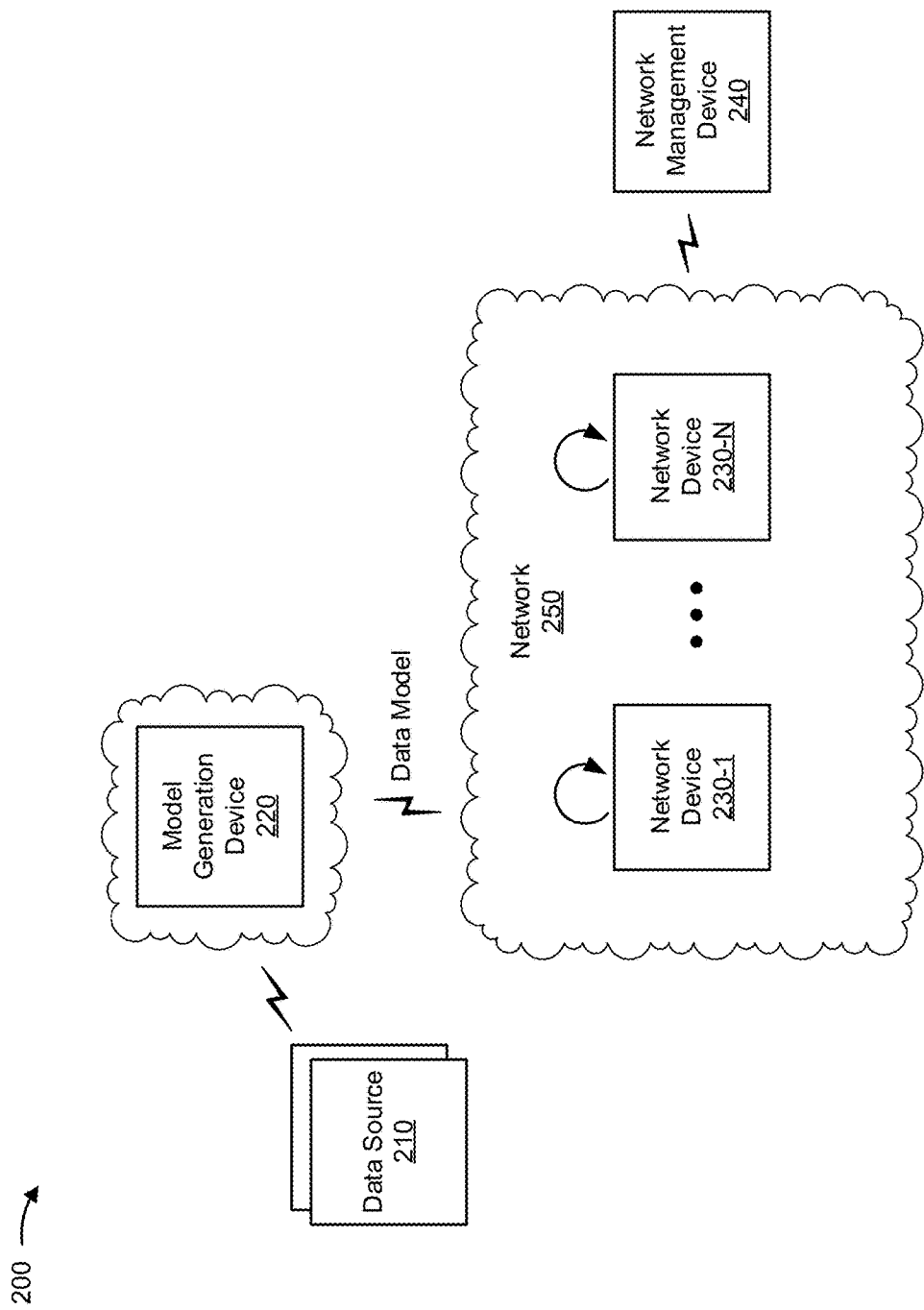
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more data sources 210, a model generation device 220, one or more network devices 230-1 through 230-N (N≥1) (hereinafter referred to collectively as "network devices 230", and individually as "network device 230"), a network management device 240, and/or a network 250. Devices of environment 200 may interconnect via wired connections, wireless connections, or a combination of wired and wireless connections.

Data source 210 includes one or more devices capable of receiving, storing, and/or providing historical link quality information. For example, data source 210 may include a server device or a group of server devices. In some implementations, data source 210 may interact with a set of network devices 230 (or other devices that may monitor link quality) to receive link quality information and store the link quality information as historical link quality information. In some implementations, data source 210 may store historical link quality information associated with a set of links. In some implementations, data source 210 may provide the historical link quality information to model generation device 220 and/or network device 230.

Model generation device 220 includes one or more devices capable of receiving, storing, processing, and/or providing information associated with link quality. For example, model generation device 220 may include a server device or a group of server devices. In some implementations, model generation device 220 may be implemented as a cloud platform. Alternatively, model generation device 220 may be implemented as a server device (e.g., an on-site server device). In some implementations, model generation device 220 may receive historical link quality information from data source 210. In some implementations, model generation device 220 may process the historical link quality information to train a data model (e.g., by creating a prediction function). In some implementations, model generation device 220 may provide a trained data model (e.g., the prediction function) to network device 230.

Network device 230 includes one or more devices capable of receiving, processing, forwarding, and/or transferring information associated with a link. For example, network device 230 may include a router, such as a label switching router (LSR), a label edge router (LER), an ingress router, an egress router, a provider router (e.g., a provider edge router, a provider core router, etc.), a virtual router, or the like. Additionally, or alternatively, network device 230 may include a gateway, a switch, a firewall, a hub, a bridge, a reverse proxy, a server (e.g., a proxy server, a cloud server, a data center server, etc.), a load balancer, or a similar device. In some implementations, network device 230 may be a physical device implemented within a housing, such as a chassis. In some implementations, network device 230 may be a virtual device implemented by one or more computer devices of a cloud computing environment or a data center.

In some implementations, network device 230 may include or connect to a set of links, and the set of links may be monitored (e.g., using a hardware component, such as a sensor or a tap, using a software module, etc.) to identify link quality information associated with the set of links. In some implementations, network device 230 may use a data model (e.g., a prediction function) to classify the link, and may perform one or more actions associated with improving accuracy of link classification (e.g., as shown in FIG. 2 by feedback loops, network devices 230 may tune the data model) and/or one or more actions associated with improving link quality. In some implementations, network device 230 may provide link quality information to data source 210 (e.g., which may be stored as historical link quality information). In some implementations, network device 230 may provide a recommendation to repair a link to network management device 240.

Network management device 240 includes one or more devices capable of receiving, storing, processing, and/or providing information associated with a link. For example, network management device 240 may include a computing device, such as a desktop computer, a laptop computer, a tablet computer, a server device, a mobile phone (e.g., a smart phone or a radiotelephone), a wearable computer (e.g., a smart watch, a smart band, a smart pair of eyeglasses, etc.), a sensor device, or a similar type of device. In some implementations, network management device 240 may receive, from network device 230, a recommendation to repair a link, to replace a board associated with the link, or the like. In this case, network management device 240 may schedule an appointment to repair the link or to replace a board associated with the link, and/or may provide a response message to network device 230 indicating that the appointment has been scheduled.

Network 250 includes one or more wired and/or wireless networks. For example, network 250 may include a cellular network (e.g., a fifth generation (5G) network, a fourth generation (4G) network, such as a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
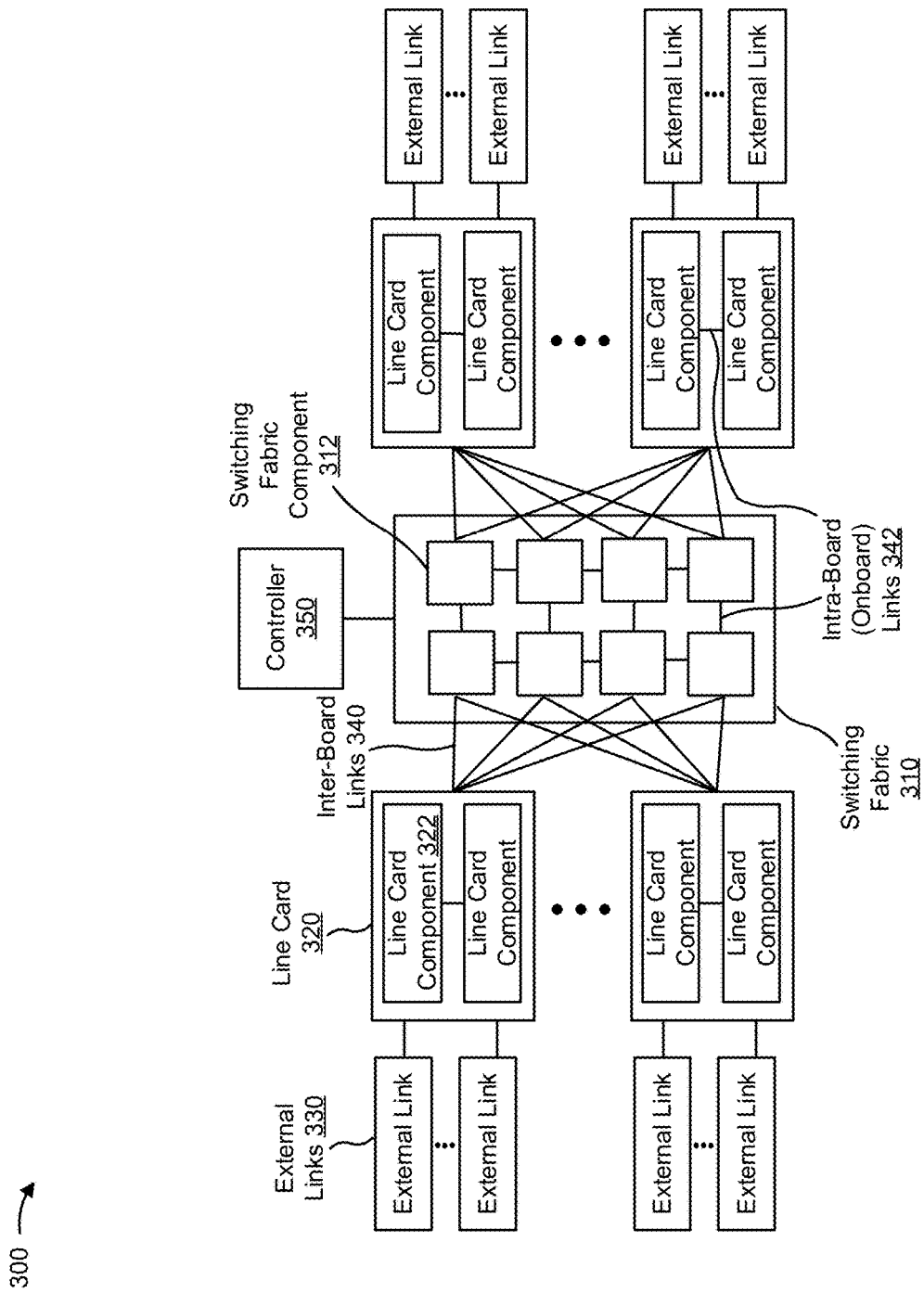
FIG. 3 is a diagram of example components of one or more devices of FIG. 2.

FIG. 3 is a diagram of example components of a device 300. Device 300 may correspond to data source 210, model generation device 220, network device 230, and/or network management device 240. In some implementations, data source 210, model generation device 220, network device 230, and/or network management device 240 may include one or more devices 300 and/or one or more components of device 300. As shown in FIG. 3, device 300 may include a switching fabric 310, one or more line cards 320, one or more links (e.g., a set of external links 330, a set of inter-board links 340, a set of intra-board (onboard) links 342, etc.), and/or a controller 350. In some implementations, traffic between switching fabric 310 and controller 350 may be provided and/or received through a single internal link 340. In some implementations, traffic between switching fabric 310 and controller 350 may be provided and/or received through a set of inter-board links 340, where each internal link 340 may be designated for a subset of external links 330 and/or a subset of line cards 320. In some implementations, line card 320 may use a set of inter-board links 340 to communicate with one or more corresponding planes of a switching fabric 310.

Switching fabric 310 interconnects external links 330 via line cards 320. In some implementations, switching fabric 310 may be implemented using one or more switching fabric components 312 (e.g., one or more crossbars, one or more busses, one or more shared memories, and/or one or more planes). In some implementations, switching fabric components 312 may be connected using intra-board (onboard) links 342. In some implementations, switching fabric 310 may enable external links 330 to communicate. For example, switching fabric 310 may connect with one or more line cards 320 via a set of inter-board links 340, and the one or more line cards 320 may connect with the external links 330, as described further herein.

Line cards 320 include one or more line card components 322. For example, line cards 320 may include a modular electronic circuit designed to fit on a PCB, and may include one or more line card component 322 (e.g., a packet processing component, a re-timer, etc.). A packet processing component may include one or more processors to process packets, and may process incoming traffic, such as by performing data link layer encapsulation or decapsulation. In some implementations, a packet processing component may receive a packet from switching fabric 310, may process the packet, and may output the processed packet to an appropriate external link 330 connected to line card component 320. Additionally, or alternatively, a packet processing component may receive a packet from an external link 330, may process the packet, and may output the processed packet to switching fabric 310 for transfer to controller 350 and/or to another external link 330 (e.g., via the same packet processing component or a different packet processing component).

External link 330 is a point of attachment for physical links, and may be a point of ingress and/or egress for incoming and/or outgoing traffic, such as packets. In some implementations, a single line card 320 may be connected to multiple external links 330. In some implementations, a single line card 320 may be connected to a single external link 330. An external link 330 may permit communication between a first network device 230 and a second network device 230 that is a neighbor of the first network device 230. External link 330 may store packets (e.g., in a buffer) and/or may schedule packets for transmission on output physical links. External link 330 may support data link layer encapsulation or decapsulation and/or a variety of higher-level protocols.

Inter-board link 340 is a path that allows line card 320 and/or controller 350 to communicate with switching fabric 310. Inter-board link 340 may include, for example, a wired or wireless path, such as a fiber-optic path, an electrical path, or the like. In some implementations, there may be multiple inter-board links 340 between a single line card component 320 and switching fabric 310. In some implementations, there may be a single inter-board link 340 between controller 350 and switching fabric 310. Intra-board (onboard) link 342 is a path that allows interconnection between line card components 322 and/or switching fabric components 312.

Controller 350 includes a processor in the form of, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 350 may include one or more processors that may be programmed to perform a function. In some implementations, controller 350 may include a group of virtual devices that each includes one or more processors.

In some implementations, controller 350 may include a random access memory (RAM), a read only memory (ROM), and/or another type of dynamic or static storage device (e.g., a flash memory, a magnetic memory, an optical memory, etc.) that stores information and/or instructions for use by controller 350.

In some implementations, controller 350 may communicate with other devices, networks, and/or systems connected to device 300 to exchange information regarding network topology. Controller 350 may create routing tables based on the network topology information, create forwarding tables based on the routing tables, and forward the forwarding tables to line card component 320, such as for use in performing route lookups for incoming and/or outgoing packets.

Controller 350 may perform one or more processes described herein. Controller 350 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 350 from another computer-readable medium or from another device via a communication interface. When executed, software instructions stored in a memory and/or storage component associated with controller 350 may cause controller 350 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
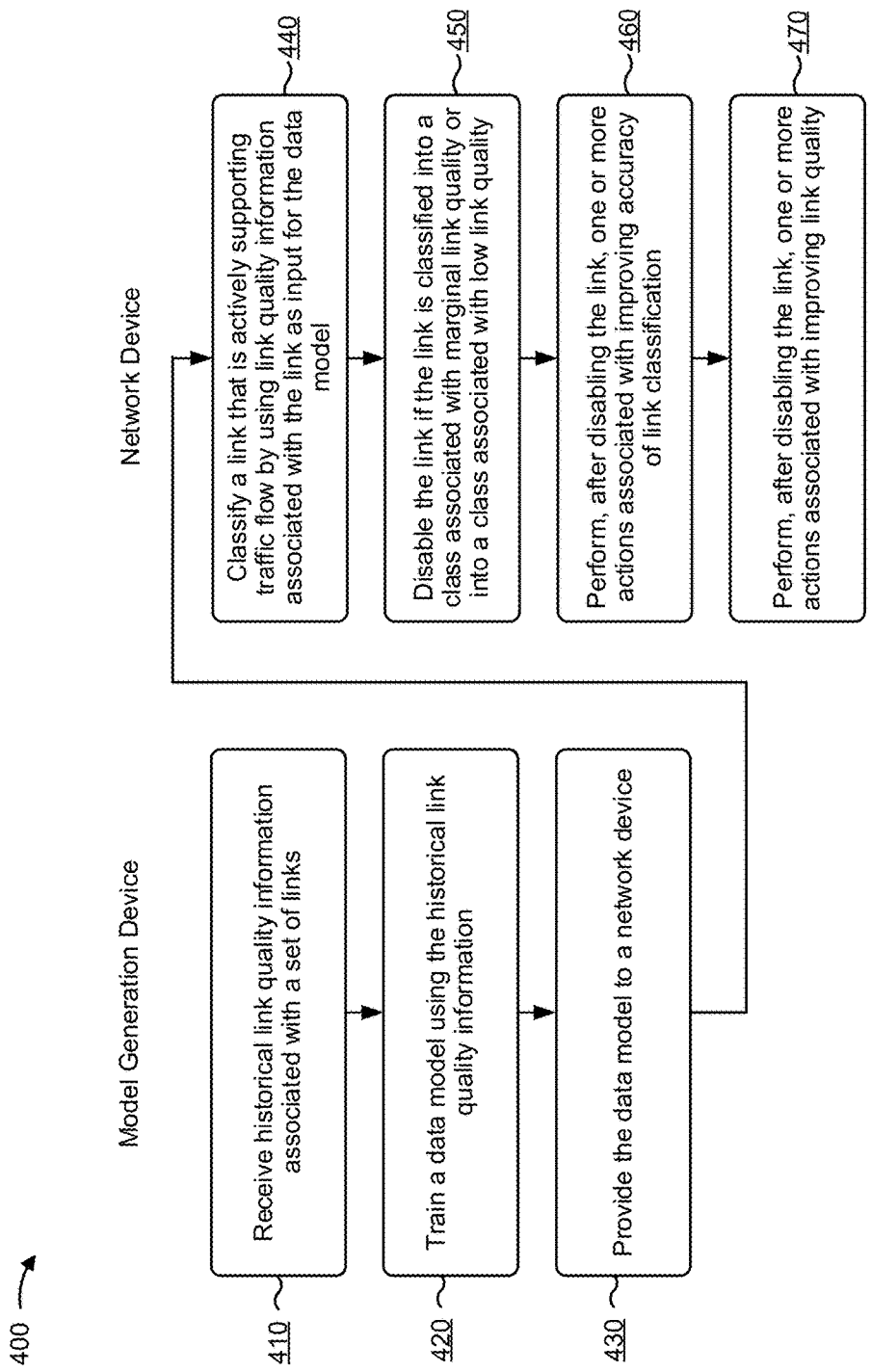
FIG. 4 is a flow chart of an example process for using machine learning to monitor link quality and detect link faults.

FIG. 4 is a flow chart of an example process 400 for using machine learning to monitor link quality and detect link faults. In some implementations, one or more process blocks of FIG. 4 may be performed by network device 230. In some implementations, one or more process blocks of FIG. 4 may be performed by another device or a group of devices separate from or including network device 230, such as data source 210, model generation device 220, and/or network management device 240.

As shown in FIG. 4, process 400 may include receiving historical link quality information associated with a set of links (block 410). For example, model generation device 220 may receive, from data source 210, historical link quality information associated with a set of links (e.g., a set of internal links within a network device, a set of external links between devices, etc.). A link may be an internal link that provides a connection between components and/or modules of a device (e.g., hardware components, software modules, etc.) or may be an external link that provides a connection between devices.

In some implementations, data source 210 may store historical link quality information. For example, data source 210 may store historical link quality information using a data structure, such as an array, a linked-list, a tree, a graph, a hash table, a database, and/or the like. In some implementations, data source 210 may store large quantities of data. For example, data source 210 may store thousands, millions, billions, or even trillions of data points.

In some implementations, model generation device 220 may receive historical link quality information. Historical link quality information may include one or more actual measures of link quality, one or more predictors of link quality, and/or one or more environment conditions. For example, the one or more actual measures of link quality may include one or more values associated with identifying errors in data transmission, such as a forward error correction (FEC) value, a cyclic redundancy check (CRC) value, one or more values measuring signal integrity, such as a signal-to-noise (SNR) ratio value, and/or the like. Additionally, the one or more predictors of link quality may include a bit error rate (BER) value, a link eye width value, a link eye height value, a link quality slope, and/or the like. Furthermore, the one or more environment conditions may include a temperature value (e.g., a temperature of the board, a temperature of the system, etc.), a link uptime value, and/or the like.

In some implementations, model generation device 220 may receive historical link quality information for a set of network devices 230. For example, model generation device 220 may receive historical link quality information for a set of network devices 230 that operate under different environment conditions. By receiving historical link quality information for devices operating under different environment conditions, the model generation device 220 may process the historical link quality information to train a data model, as described further herein.

In this way, model generation device 220 may receive historical link quality information associated with a set of links, such that the information may be used to train a data model.

As further shown in FIG. 4, process 400 may include training a data model using the historical link quality information (block 420). For example, model generation device 220 may, using a machine learning technique, train a data model that may be used to classify a link, as described further herein.

In some implementations, model generation device 220 may train a data model for use by a set of network devices 230. For example, model generation device 220 may train a data model by creating a prediction function, and may provide the prediction function to the set of network devices 230. In this case, model generation device 220 may create the prediction function by associating values included in the historical link quality information with dynamic quality coefficient values (e.g., which may be positive or negative). A quality coefficient value may be a value indicating a particular link quality measurement. In some cases, the quality coefficient values may be grouped into classes associated with high link quality, marginal link quality, or low link quality.

Additionally, model generation device 220 may create the prediction function by configuring one or more weight values that may be used in determining an overall link quality score. For example, model generation device 220 may assign weights to particular quality coefficient values. In this way, model generation device 220 may use the weighted quality coefficient values to determine an overall link quality score.

In some implementations, as described herein, model generation device 220 may train a data model using a supervised machine learning technique. Additionally, or alternatively, model generation device 220 may train a data model using a different type of machine learning technique, such as machine learning via clustering, dimensionality reduction, structured prediction, anomaly detection, neutral networks, reinforcement learning, or the like.

In this way, model generation device 220 may, using the historical link quality information, train a data model that may be used by a set of network devices 230 to classify a set of links that actively support traffic flow. While the set of network devices 230 may utilize the data model to classify a set of links that actively support traffic flow, implementations described herein describe a data flow associated with a single network device 230 and a single link to illustrate the example process.

As further shown in FIG. 4, process 400 may include providing the data model to a network device (block 430). For example, model generation device 220 may provide the data model (e.g., that includes the prediction function) to network device 230. In this way, network device 230 may use the data model to classify a link that is actively supporting traffic flow.

As further shown in FIG. 4, process 400 may include classifying a link that is actively supporting traffic flow by using link quality information associated with the link as input for the data model (block 440). For example, network device 230 may receive the data model, and may determine link quality information associated with a link that is actively supporting traffic flow, and may use the link quality information as input for the data model. In this case, the data model may output an overall link quality score that serves to classify the link into a class associated with high link quality, a class associated with marginal link quality, or a class associated with low link quality. In other cases, the data model may use a different classification scheme, such as a classification scheme with more classes, a classification scheme with less classes, a classification scheme focused on a different metric (e.g., a subset of link quality, such as particular link quality metric), or the like.

In some implementations, network device 230 may determine link quality information associated with a link that is actively supporting traffic flow. For example, network device 230 may use one or more techniques to determine link quality for the link and/or monitor environment conditions. In some cases, network device 230 may use different quality monitoring techniques to monitor different values included in the link quality information. As an example, network device 230 may monitor bits traveling through the link to determine a BER value. As another example, network device 230 may use one or more sensors to monitor and measure temperature values associated with the board, an ASIC, etc. In this way, network device 230 may determine link quality information for a link that is actively supporting traffic flow.

In some implementations, network device 230 may classify a link into a class associated with high link quality. For example, network device 230 may use, as input for the data model, link quality information that includes one or more values associated with high link quality (e.g., a low BER value, a low FEC value, etc.). In this case, the data model may output an overall link quality score associated with high link quality. In some implementations, network device 230 may classify a link into a class associated with marginal link quality or a low link quality in the same manner described above.

In this way, network device 230 is able to classify the link into a class associated with a particular quality level, and may prevent link failure and traffic loss by disabling links with a marginal or low link quality.

As further shown in FIG. 4, process 400 may include disabling the link if the link is classified into a class associated with marginal link quality or into a class associated with low link quality (block 450). For example, network device 230 may classify the link into a class associated with marginal link quality or low link quality, may redirect traffic to avoid traffic flow via the link, and may disable the link.

In some implementations, prior to disabling the link, network device 230 may determine an actual quality level of the link by executing an FEC technique, a CRC technique, or the like. For example, network device 230 may execute an FEC technique, a CRC technique, or the like, to determine whether an output of the data model is a false prediction (e.g., a false positive, a false neutral, a false negative). In this case, if network device 230 detects a false prediction, then network device 230 may update the data model, thereby improving accuracy of subsequent link predictions.

In some implementations, network device 230 may disable the link. For example, assume the link is classified into a class associated with marginal link quality or low link quality. In this case, network device 230 may redirect traffic to avoid traffic flow via the link (e.g., by assigning one or more additional links to support traffic flow associated with the link classified as marginal link quality or low link quality). Additionally, network device 230 may disable the link to allow one or more actions to be executed to improve accuracy of link classification.

As further shown in FIG. 4, process 400 may include performing, after disabling the link, one or more actions associated with improving accuracy of link classification (block 460). For example, network device 230 may determine an actual quality of the link (e.g., by performing a diagnostic test, etc.), update the data model (e.g., by modifying quality coefficient values, threshold values, weight values, etc.), update the class of the link, and/or the like.

In some implementations, network device 230 may determine an actual quality level of the link by performing a diagnostic test. For example, network device 230 may perform a pseudorandom binary sequence (PRBS) test to determine an actual quality level of the link. In this case, network device 230 may perform a PRBS test to determine an actual quality level of the link (e.g., high quality, marginal quality, low quality, etc.), and may compare the actual quality level of the link and the link classification to determine whether the link is correctly classified.

In some cases, the PRBS test may be able to determine an actual quality level of the link by determining how many bits are able to accurately travel through the link (e.g., whether a zero bit stays a zero bit from a first side of the link to a second side of the link, whether a one bit stays a one bit from a first side of the link to a second side of the link, and/or the like). In this case, the PRBS test may use thresholds to determine an actual quality level of the link. If a first threshold amount of bits accurately travel through the link, then the PRBS test may determine that the link is associated with high link quality. If a second threshold amount of bits accurately travel through the link, then the PRBS test may determine that the link is associated with marginal link quality. If a third threshold amount of bits accurately travel through the link, then the PRBS test may determine that the link is associated with low link quality. In this way, the PRBS test may compare the actual quality of the link to the link classification to determine whether the link is correctly classified.

In some implementations, network device 230 may update the class of the link based on a result of the diagnostic test. For example, network device 230 may update the class of the link if the diagnostic test indicates that an actual quality of the link is different from a quality associated with the classification.

In some implementations, network device 230 may update the class of the link by updating the data model. For example, network device 230 may modify (e.g., increase, decrease, etc.) one or more of the quality coefficient values based on a result of the diagnostic rest. In this case, network device 230 may re-provide the link quality information as input to the data model, which may cause the data model to update the class of the link using the one or more modified quality coefficient values. In this way, network device 230 increases accuracy of subsequent predictions (e.g., relative to not updating the data model).

As an example, assume network device 230 classifies the link into a class associated with high link quality and that the link fails the diagnostic test. In this case, network device 230 may update the class of the link to a class associated with marginal link quality or to a class associated with low link quality based on an output of the diagnostic test. Additionally, network device 230 may modify quality coefficient values that are associated with classifying the link, thereby allowing network device 230 to make more accurate subsequent link quality predictions. In this way, network device 230 may update the data model to eliminate false-positives (e.g., predictions that link quality is high when actual link quality is low).

As another example, assume network device 230 classifies the link into a class associated with marginal link quality and that the link does not receive a diagnostic test score associated with marginal link quality. In this case, network device 230 may update the class of the link to a class associated with high link quality or to a class associated with low link quality. If the link passes the diagnostic test (e.g., receives a score associated with high link quality), then network device 230 may update the data model by modifying quality coefficient values that are associated with classifying the link. If the link fails the diagnostic test (e.g., receives a score associated with low link quality), then network device 230 may update the data model by modifying quality coefficient values that are associated with classifying the link. In this way, network device 230 may update the data model to eliminate false-neutrals (e.g., predictions that link quality is marginal when actual link quality is high or low).

As another example, assume network device 230 classifies the link into a class associated with low link quality and that the link passes the diagnostic test. In this case, network device 230 may update the class of the link to a class associated with high link quality or to a class associated with marginal link quality. If the link passes the diagnostic test with a score associated with high link quality, then network device 230 may update the data model by modifying quality coefficient values that are associated with classifying the link. If the link passes the diagnostic test with a score associated with a marginal quality link, then network device 230 may update the data model by modifying (e.g., by a lower amount than an amount associated with updating the class of the link to a class associated with high link quality) quality coefficient values that are associated with classifying the link. In this way, network device 230 may update the data model to eliminate false-negatives (e.g., predictions that link quality is low when actual link quality is marginal or high).

As another example, assume network device 230 classifies the link and that the diagnostic test confirms that the classification is correct. In this case, network device 230 may update the data model with information indicating that the quality coefficient values used are the correct values. In this way, network device 230 is able to classify subsequent links that have similar link quality information with a higher degree of confidence.

In some implementations, network device 230 may monitor reclassified links (i.e., links that have had the classification updated). For example, network device 230 may monitor reclassified links by receiving an increased frequency of link quality information (e.g., an increased frequency as compared to a frequency in which link quality information was received during block 440). Additionally, network device 230 may make an increased number of link quality predictions to verify whether the reclassification improved accuracy of link classification. In some implementations, network device 230 may monitor reclassified links over a time interval. In some cases, a duration of the interval may be associated with link quality (e.g., a longer interval for low quality links than for marginal quality links).

As an example, assume network device 230 determines that the link is a high risk link by classifying the link as having low link quality. In this case, network device 230 may monitor and test the link more frequently and more extensively than monitoring and testing associated with lower risk links.

In some implementations, network device 230 may iteratively determine whether the link is correctly classified and may iteratively update the class of the link until the link is correctly classified.

By performing one or more actions associated with improving accuracy of link classification, a data model that has been continuously updated by network device 230 may correctly classify link quality in all (or most) situations, thereby allowing network device 230 to perform one or more associated with improving link quality.

As further shown in FIG. 4, process 400 may include performing, after classifying the link, one or more actions associated with improving link quality (block 470). For example, network device 230 may adapt to environmental conditions associated with the link (e.g., a temperature level, a voltage level, etc.), provide a report and/or a recommendation to an interested party (e.g., a network administrator, a technician, etc.), and/or the like.

In some implementations, network device 230 may adapt to environmental conditions associated with the link. For example, network device 230 may identify false predictions (e.g., false positives, false neutrals, false negatives, etc.), and may adapt to environmental conditions by retraining the data model after identifying the false predictions. In this way, network device 230 may retrain the data model to adapt to environmental conditions of a particular network device.

In some implementations, network device 230 may implement a forecasting technique with a separate data model. For example, network device 230 may train a separate data model that includes a set of characteristics associated with link faults (e.g., including data leading up to link failure). In this case, network device 230 may provide link quality information associated with an active link as input for the separate data model, which may cause the separate data model to output a projected time period at which the link is predicted to degrade in link quality past a particular link quality threshold.

In some implementations, network device 230 may blacklist the link (i.e., prevent the link from being able to actively support traffic flow). For example, network device 230 may blacklist a low quality link to prevent loss of traffic until the link and/or the board is repaired and/or replaced. In some cases, network device 230 may determine whether the link has a history of being classified into a class associated with low link quality, and may blacklist the link if the link has been classified into the class associated with low link quality more than a threshold number of times. In some cases, network device 230 may blacklist the link by providing an indication to a software module that controls link traffic that the link is no longer able to support traffic flow.

As an example, assume the link is classified into a class associated with low link quality. In this case, if the link has a history of being classified into the class associated with low link quality, then network device 230 may blacklist the link, thereby preventing the link from actively supporting traffic flow. If the link does not have a history of being classified into the class associated with low link quality, then network device 230 may perform a diagnostic test to determine an actual quality of the link, as described above. In this way, network device 230 is able to reduce link faults (e.g., packet loss, signal attenuation, etc.) within network device 230 until the link and/or the board is repaired and/or replaced.

Additionally, or alternatively, network device 230 may provide, to network management device 240, a recommendation to repair or replace one or more hardware components and/or software modules associated with the link. For example, network device 230 may generate a recommendation that includes link quality information for the link, results of a diagnostic test, and/or instructions indicating a particular action to be performed (e.g., repair the link, repair the board, replace the link, replace the board, etc.). In this case, network device 230 may provide the recommendation to network management device 240. In some implementations, network device 230 may automatically schedule an appointment to have an interested party (e.g., a technician) repair a hardware component and/or a software module associated with the link.

In this way, network device 230 may perform one or more actions associated with improving link quality. Additionally, network device 230 predicting link faults prior to the occurrence of the faults prevents traffic loss. Furthermore, by performing one or more actions associated with improving accuracy of link classification and/or link quality, network device 230 improves efficiency and reliability of network communications.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
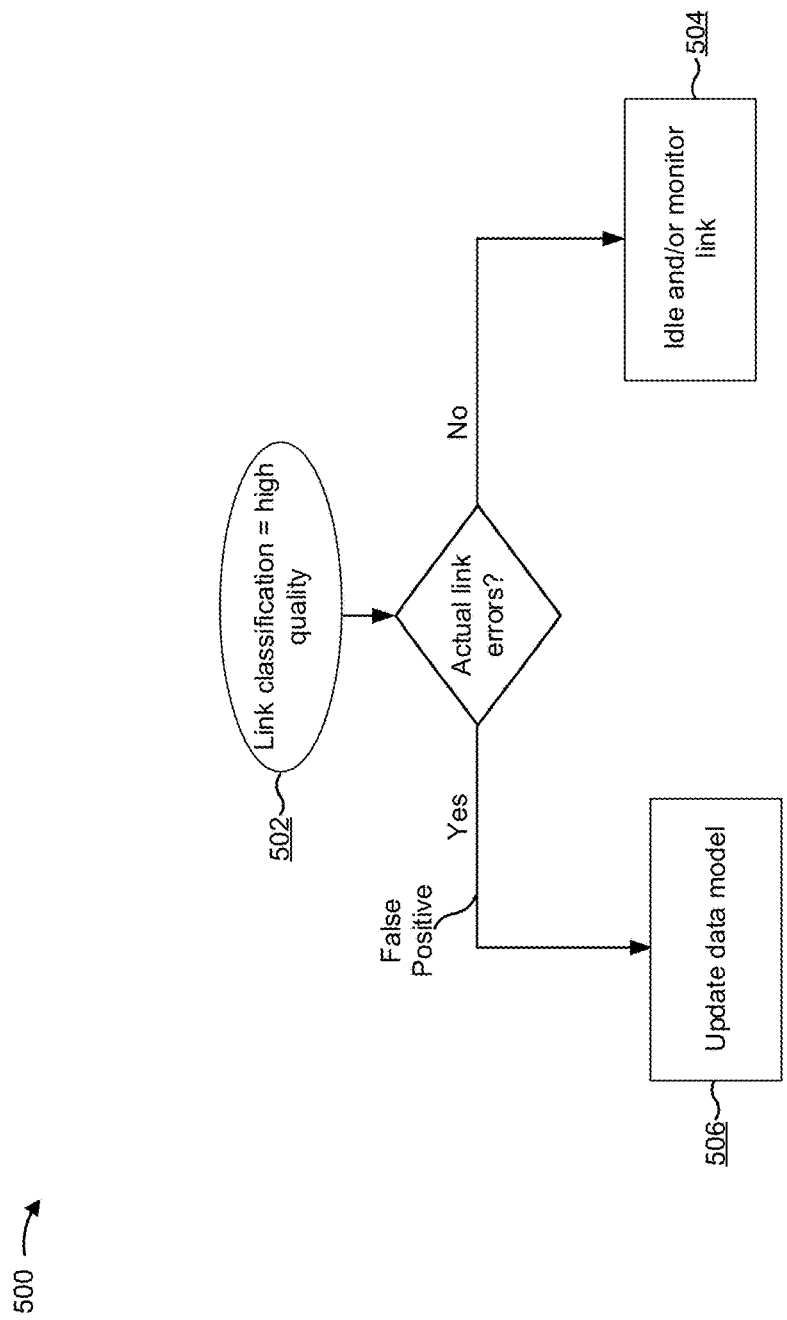
FIGS. 5A-5C are diagrams of one or more example implementations relating to the example process shown in FIG. 4.
Figure 5B:
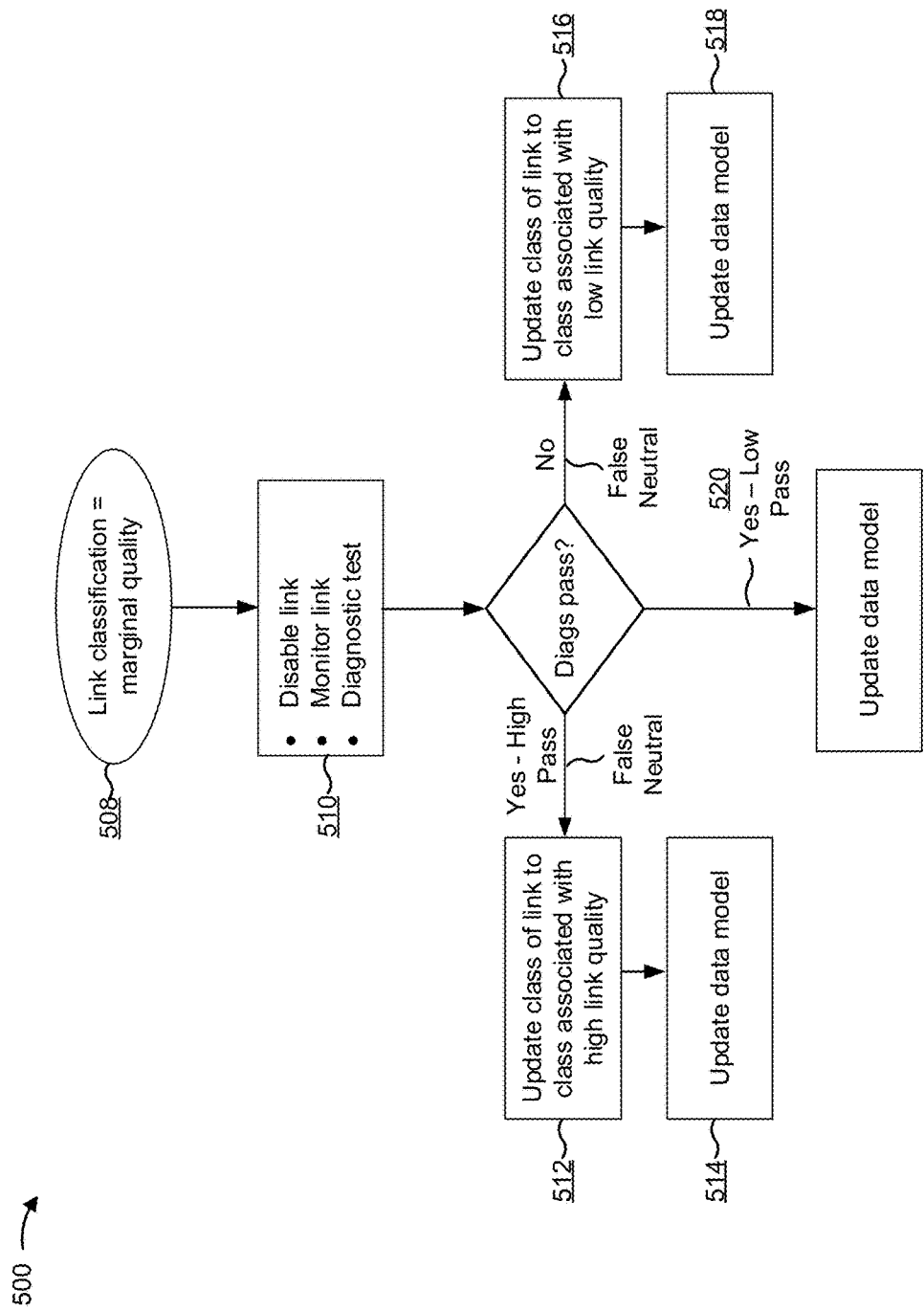
Figure 5C:
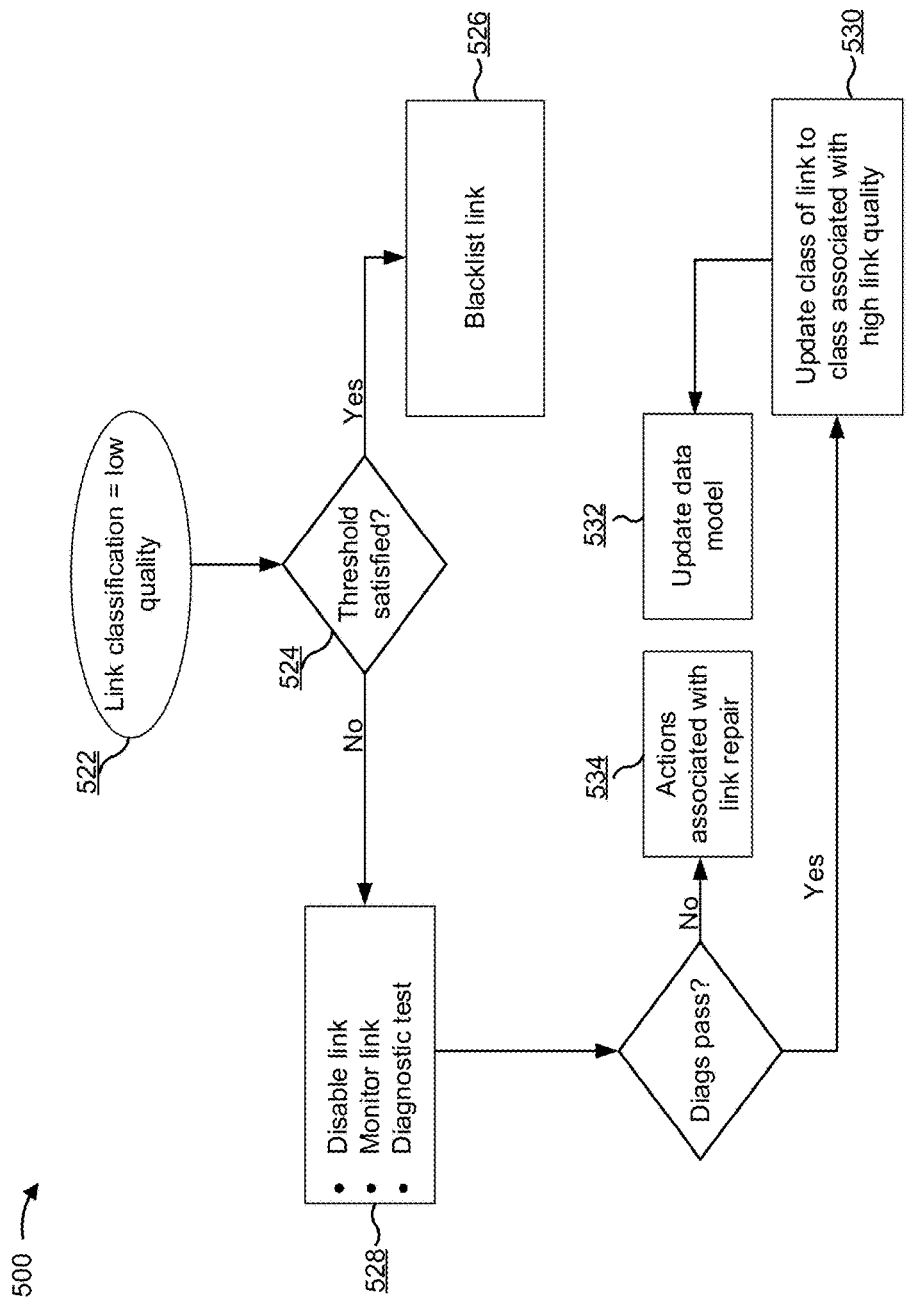

FIGS. 5A-5C are diagrams of one or more example implementations relating to the example process shown in FIG. 4. FIG. 5A shows an example implementation where network device 230 may identify a false positive, and my update the data model to improve accuracy of link classification. FIG. 5B shows an example implementation where network device 230 may identify a false neutral, and may update the data model to improve accuracy of link classification. FIG. 5C shows an example implementation where network device 230 may identify a false negative, and may update the data model to improve accuracy of link classification. In this way, network device 230 may continue to improve link classification until the data model is able to correctly classify all (or close to all) of the links, thereby ensuring that actions may be taken to improve link quality.

As shown in FIG. 5A, network device 230 may identify false positives (e.g., the data model may falsely classify a link into a class associated with high link quality when actual link quality is marginal or low). As shown by reference number 502, network device 230 may classify the link into a class associated with high link quality. In this case, network device 230 may determine whether actual link errors (e.g., hardware errors) are associated with the link by executing a FEC technique, a CRC technique, or the like.

As shown by reference number 504, if network device 230 determines that there are no FEC errors, CRC errors, or the like, then network device 230 may idle and/or monitor the link. In this case, the FEC technique, the CRC technique, or the like, serve to verify that link is correctly classified as having high link quality.

As shown by reference number 506, if network device 230 determines that there are FEC errors, CRC errors, or the like, then network device 230 may update the data model. In this case, network device 230 may update the data model by modifying one or more quality coefficient values. In this case, modifying the one or more quality coefficient values associated with the link quality information may allow the data model to correctly classify links with similar link quality information when the data model is used for subsequent classifications.

In this way, network device 230 is able to identify false positives, and may update the data model to improve the accuracy of link classification.

As shown in FIG. 5B, network device 230 may identify false neutrals (e.g., the data model may falsely classify a link into a class associated with marginal link quality when actual link quality is high or low). As shown by reference number 508, network device 230 may classify a link into a class associated with marginal link quality. In this case, and as shown by reference number 510, network device 230 may disable, monitor, and test the link, in the same manner described above. As shown by reference number 512, if the link passes the test with a high passing score (shown as a "high pass"), then network device 230 may update the class of the link to a class associated with high link quality. In this case, network device 230 may re-enable the link to allow the link to continue supporting network traffic flow.

Additionally, and as shown by reference number 514, network device 230 may update the data model. For example, network device 230 may update the data model by modifying one or more quality coefficient values. In this case, modifying the one or more quality coefficient values associated with the link quality information may allow the data model to correctly classify links with similar link quality information when the data model is used for subsequent classifications.

As shown by reference number 516, if the link fails the diagnostic test, then network device 230 may update the class of the link to a class associated with low link quality. In this case, and as shown by reference number 518, network device 230 may update the data model. For example, network device 230 may update the data model by modifying one or more quality coefficient values. This may allow the data model to correctly classify links with similar link quality information when the data model is used for subsequent classifications.

As shown by reference number 520, if the link passes the test with a low passing score (shown as a "low pass"), then network device 230 may update the class of the link to a class associated with marginal link quality. In this case, network device 230 may update the data model by updating one or more values associated with confidence scores, as described above.

In this way, network device 230 is able to identify false neutrals, and may update the data model to improve the accuracy of link classification.

As shown in FIG. 5C, network device 230 may identify false negatives (e.g., the data model may falsely classify a link into a class associated with low link quality when actual link quality is marginal or high). As shown by reference number 522, network device 230 may classify a link into a class associated with low link quality.

As shown by reference number 524, network device 230 may determine whether the link has received a threshold number of classifications associated with low link quality. In this case, network device 230 may compare a current number of times the link is classified into a class associated with low link quality and a threshold number of classifications associated with low link quality. As shown by reference number 526, network device 230 may blacklist the link, as described elsewhere herein. In this way, network device 230 is able to prevent links that are repeatedly classified as low quality from supporting traffic flow.

As shown by reference number 528, if the current number of times the link is classified into a class associated with low link quality does not satisfy the threshold number of classifications, then network device 230 may disable, monitor, and test the link (e.g., using a diagnostic test), as described elsewhere herein. As shown by reference number 530, if the link passes the diagnostic test, then network device 230 may update the class of the link to a class associated with high link quality. In this case, and as shown by reference number 532, network device 230 may update the data model by modifying one or more quality coefficient values. This may allow the data model to correctly classify a subsequent link with similar link quality information.

As shown by reference number 534, if the link fails the diagnostic test, then network device 230 may perform one or more actions associated with repairing the link. For example, network device 230 may provide a request to a network management device to repair the link, repair a board associated with the link, replace the board, and/or the like.

In this way, network device 230 is able to identify false negatives, and may update the data model to improve the accuracy of link classification.

As indicated above, FIGS. 5A-5C are provided merely as examples. Other examples are possible and may differ from what was described with regard to FIGS. 5A-5C.

In this way, network device 230 is able to identify false positives, false neutrals, and/or false negatives, and may update the data model to improve the accuracy of link classification. By correctly classifying links, network device 230 is able to identify situations where a link is beginning to degrade in quality, and is able to take corrective actions needed to repair the link, repair the board, replace the link, or replace the board, as described elsewhere herein. In this way, network device 230 improves network performance relative to taking corrective action after a link fails.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
receive a trained data model,
the data model being trained with historical link quality information associated with a set of links,
the data model including one or more values associated with measuring link quality;
determine, after receiving the trained data model, link quality information associated with a link that is actively supporting traffic flow;
classify the link by using the link quality information as input for the data model,
the data model to classify the link into:
a first class associated with a first measure of link quality,
a second class associated with a second measure of link quality, or
a third class associated with a third measure of link quality;
determine that the link is not correctly classified by updating the data model with information associated with improving accuracy of classifying the link,
where the one or more processors, when determining that the link is not correctly classified, are to:
identify a quantity of times that the link has been classified into a class,
determine that the quantity of times that the link has been classified into the class does not satisfy a threshold quantity of classifications associated with the class,
disable the link after determining that the quantity of times that the link has been classified into the class does not satisfy the threshold quantity of classifications associated with the class, and
perform, after disabling the link, a diagnostic test to identify that the link is not correctly classified;
update the class of the link to the first class, the second class, or the third class after determining that the link is not correctly classified,
where the one or more processors, when updating the class of the link, are to:
update the class of the link to another class associated with a link quality that is different from a link quality of the class; and
perform one or more actions associated with improving the link quality based on at least one of classifying the link or updating a class of the link.

2. The device of claim 1, where one or more of the historical link quality information or the link quality information includes at least one of:
one or more actual measures of link quality,
one or more predictors of link quality,
one or more environment conditions, or
some combination thereof.

3. The device of claim 1, where the one or more processors, when classifying the link, are to:
classify the link into the second class or the third class,
the second class being associated with marginal link quality and the third class being associated with low link quality; and
where the one or more processors are further to:
update, based on determining that the link is not correctly classified, the data model with dynamic quality coefficient values,
the dynamic quality coefficient values being associated with retraining the data model to improve accuracy of link classification.

4. The device of claim 1, where the one or more processors, when classifying the link, are to:
classify the link into the third class associated with the third measure of link quality, the third measure of link quality being associated with low link quality, and
disable the link prior to an occurrence of an actual link error to prevent traffic drops on the link.

5. The device of claim 1, where the one or more processors, when determining that the link is not correctly classified, are to:
perform the diagnostic test to determine an actual quality level of the link,
compare the actual quality level of the link and a quality level associated with the class of the link,
determine that the link is not correctly classified based on comparing the actual quality level of the link and the quality level associated with the class of the link, and
where the one or more processors are further to:
update the data model with one or more quality coefficient values that are associated with updating the class of the link based on determining that the link is not correctly classified.

6. The device of claim 1, where the one or more processors, when performing the one or more actions associated with improving the link quality, are to:
perform at least one of the one or more actions, the one or more actions including:
adapting to one or more environmental conditions associated with the link, or
providing a recommendation to a device associated with an interested party to repair or replace one or more hardware components and/or software modules associated with the link.

7. The device of claim 1, where the one or more actions include:
adapting to one or more environmental conditions associated with the link, or
providing a recommendation to a device associated with an interested party to repair or replace one or more hardware components and/or software modules associated with the link.

8. A non-transitory computer-readable medium storing instructions, the instructions comprising:
one or more instructions that, when executed by one or more processors, cause the one or more processors to:
obtain a data model that is trained using historical link quality information associated with a set of links,
the historical link quality information including one or more values associated with measuring link quality;
determine, after obtaining the data model, link quality information associated with a link that is actively supporting traffic flow;
classify the link by using the link quality information as input for the data model,
the data model to classify the link into a class of a set of classes associated with measuring link quality;
determine that the link is not correctly classified by performing one or more actions associated with improving accuracy of classifying the link,
where the one or more instructions, that cause the one or more processors to determine that the link is not correctly classified, cause the one or more processors to:
identify a quantity of times that the link has been classified into the class,
determine that the quantity of times that the link has been classified into the class does not satisfy a threshold quantity of classifications associated with the class,
disable the link after determining that the quantity of times that the link has been classified into the class does not satisfy the threshold quantity of classifications associated with the class, and
perform, after disabling the link, a diagnostic test to identify that the link is not correctly classified;
selectively update the class of the link after determining that the link is not correctly classified, where the one or more instructions, that cause the one or more processors to selectively update the class of the link, cause the one or more processors to:
update the class of the link to another class associated with a link quality that is different from a link quality of the class; and
perform one or more actions associated with improving link quality based on at least one of classifying the link or selectively updating the class of the link.

9. The non-transitory computer-readable medium of claim 8, where the one or more instructions,
when executed by the one or more processors, further cause the one or more processors to:
update, based on determining that the link is not correctly classified, the data model by modifying one or more quality coefficient values,
the one or more quality coefficient values being associated with adapting to environment conditions by improving the accuracy of link classification.

10. The non-transitory computer-readable medium of claim 8, where the one or more instructions, when executed by the one or more processors, further cause the one or more processors to:
identify a quantity of times that the link has been classified into the class, and
determine that the quantity of times that the link has been classified into the class satisfies the threshold quantity of classifications associated with the class; and
where the one or more instructions, when executed by the one or more processors, further cause the one or more processors to:
blacklist the link after determining that the quantity of times that the link has been classified into the class satisfies the threshold quantity of classifications associated with the class.

11. The non-transitory computer-readable medium of claim 8, where the one or more instructions, that cause the one or more processors to classify the link, cause the one or more processors to:
classify the link into a class associated with a low link quality; and
where the one or more instructions, when executed by the one or more processors, further cause the one or more processors to:
assign one or more additional links to support traffic flow associated with the link, and
disable the link after the one or more additional links begin supporting traffic flow.

12. The non-transitory computer-readable medium of claim 8, where the one or more actions include:
adapting to one or more environmental conditions associated with the link, or
providing a recommendation to a device associated with an interested party to repair or replace one or more hardware components and/or software modules associated with the link.

13. The non-transitory computer-readable medium of claim 8, where the one or more instructions, that cause the one or more processors to determine the actual quality level of the link, cause the one or more processors to:
determine that the link is a high risk link, and
monitor and test the link,
wherein the link is monitored and tested more frequently and more exhaustively than a link that is not determined to be a high-risk link.

14. A method, comprising:
receiving, by a device, a trained data model,
the trained data model being trained using historical link quality information associated with a set of links;
determining, by the device and after receiving the trained data model, link quality information associated with a link that is actively supporting traffic;
classifying the link, by the device, by using the link quality information as input for the data model,
the data model to classify the link into a class of a set of classes associated with measuring link quality;
determining, by the device, an actual quality level of the link, where determining the actual quality level of the link comprises:
identifying a quantity of times that the link has been classified into the class,
determining whether the quantity of times that the link has been classified into the class satisfies a threshold quantity of classifications, and
performing a diagnostic test to determine the actual quality level of the link if the quantity of times that the link has been classified into the class does not satisfy the threshold quantity of classifications;
selectively updating the class of the link, by the device, after determining the actual link quality of the link; and
performing, by the device, one or more actions associated with improving link quality based on at least one of classifying the link or selectively updating the class of the link.

15. The method of claim 14, further comprising:
performing the diagnostic test to determine the actual quality level of the link,
comparing the actual quality level of the link and a quality level associated with the class of the link,
determining whether the link is correctly classified based on comparing the actual quality level of the link and the quality level associated with the class of the link, and
updating the data model with one or more values that are associated with classifying and/or updating the class of the link.

16. The method of claim 14, where further comprising:
disabling the link after classifying the link into the class,
performing, after disabling the link, the diagnostic test to identify that the link is not correctly classified, and
updating the data model by modifying one or more quality coefficient values that are associated with classifying and/or updating the class of the link,
the one or more quality coefficient values being modified based on a result of the diagnostic test; and
where updating the class of the link comprises:
updating the class of the link to another class using the data model that has been updated.

17. The method of claim 16, where updating the data model comprises:
updating the data model using the one or more modified quality coefficient values; and
where selectively updating the class of the link comprises:
providing the link quality information as input for the data model,
the data model to update the class of the link using the one or more modified quality coefficient values.

18. The method of claim 14, further comprising:
disabling the link after classifying the link into the class,
performing, after disabling the link, the diagnostic test to identify whether the link is correctly classified, and
determining whether to the update the data model based on a result of the diagnostic test,
the data model to be updated if the result of the diagnostic test indicates that the link is incorrectly classified.

19. The method of claim 14, where determining the actual quality level of the link comprises:
determining that the link is a high risk link, and
monitoring and testing the link,
the monitoring and testing being more frequent and more exhaustive than monitoring and testing associated with lower risk links.

20. The method of claim 14, where the one or more actions include:
adapting to one or more environmental conditions associated with the link, or
providing a recommendation to a device associated with an interested party to repair or replace one or more hardware components and/or software modules associated with the link.

* * * * *